(12) United States Patent
Bell et al.

(10) Patent No.: US 9,654,905 B2
(45) Date of Patent: May 16, 2017

(54) ENABLING NEAR FIELD COMMUNICATIONS USING INDICATORS

(71) Applicant: International Business Machines Corporation, Armonk, NY (US)

(72) Inventors: Mark Bell, Gournay en Bray (FR); Gregory J. Boss, Saginaw, MI (US); Peter G. Finn, Markham (CA); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/680,309

(22) Filed: Apr. 7, 2015

(65) Prior Publication Data
US 2016/0302025 A1 Oct. 13, 2016

(51) Int. Cl.
*H04B 5/00* (2006.01)
*H04W 4/00* (2009.01)

(52) U.S. Cl.
CPC .......... *H04W 4/008* (2013.01); *H04B 5/0031* (2013.01)

(58) Field of Classification Search
CPC ....... H04B 5/00; H04B 5/0031; H04W 4/008; H04W 12/06; H04W 88/02
USPC .......................................... 455/41.1, 410, 411
See application file for complete search history.

(56) References Cited

U.S. PATENT DOCUMENTS

| | | | |
|---|---|---|---|
| 7,301,528 B2 | 11/2007 | Marvit et al. | |
| 8,175,529 B2 | 5/2012 | Wakasa et al. | |
| 8,260,269 B2 | 9/2012 | Faith et al. | |
| 9,237,465 B1* | 1/2016 | Tanner | H04W 24/04 |
| 2007/0015463 A1* | 1/2007 | Abel | H04B 5/0031 455/41.1 |
| 2010/0081385 A1* | 4/2010 | Lin | H04M 1/7253 455/41.3 |
| 2011/0070825 A1* | 3/2011 | Griffin | H04B 5/0031 455/41.1 |
| 2011/0070828 A1* | 3/2011 | Griffin | H04M 1/7253 455/41.1 |
| 2011/0070829 A1 | 3/2011 | Griffin et al. | |
| 2011/0177780 A1* | 7/2011 | Sato | H04W 36/14 455/41.1 |
| 2012/0202423 A1 | 8/2012 | Tiedemann et al. | |

(Continued)

FOREIGN PATENT DOCUMENTS

WO 2008085788 A2 7/2008

OTHER PUBLICATIONS

Levi, Joe, "Android Key Lime Pie Might Introduce This Gesture-Based UI", Mar. 26, 2013, Pocketnow, pp. 1-5, <http://pocketnow.com/2013/03/26/android-5-gesture-based-ui>.

(Continued)

*Primary Examiner* — Ayodeji Ayotunde
(74) *Attorney, Agent, or Firm* — Erik K. Johnson

(57) ABSTRACT

Embodiments of the present invention provide time-efficient and effective systems and methods for enabling near field communications (NFC) on electronic devices using one or more indicators. Embodiments of the present invention provide systems and methods that capture and utilize indicators such as, motion of the electronic device or of a user, electromagnetic wave signals, and audio signals to more easily establish an NFC link between a source computer system and a target computer system.

11 Claims, 4 Drawing Sheets

(56) References Cited

U.S. PATENT DOCUMENTS

| | | |
|---|---|---|
| 2012/0252359 A1 | 10/2012 | Adams et al. |
| 2012/0271725 A1 | 10/2012 | Cheng |
| 2012/0302163 A1 | 11/2012 | Kitchen |
| 2012/0329386 A1 | 12/2012 | Reyner |
| 2013/0324169 A1* | 12/2013 | Kamal ................. H04W 4/008 455/466 |

OTHER PUBLICATIONS

"Leap Motion Control Device", Uncrate, provided by inventors in disclosure on Nov. 19, 2012, pp. 1-2, Copyright © MMXIV Zombiecorp, <http://uncrate.com/stuff/leap-motion-control-device/>.

* cited by examiner

ENABLING NEAR FIELD COMMUNICATIONS USING INDICATORS

BACKGROUND OF THE INVENTION

The present invention relates generally to the field of radio frequency identification chips, and more specifically to enabling near field communications using indicators.

Electronic devices that provide near field communication (NFC) technology enable a user to perform a plurality of different actions. For example, the user can exchange contact details, data files, or payment information by activating the NFC technology on an electronic device. Additionally, a user may perform a payment process using an electronic device with NFC technology. A typical payment process may involve the user activating the NFC technology, such that the electronic device emits an RF (radio frequency) field and polls for the presence of a receiving electronic device (e.g., target payment provider). In some instances, an electronic device may interact with a receiving electronic device to establish an NFC link when a user positions the electronic device in the vicinity of the receiving electronic device. Often, the device may be capable of interaction with a number of different NFC systems which may be achieved through emulation by the devices of the characteristic interfaces of each of a number of said systems, whereby the user is prompted to select a method of NFC payment. The typical payment process using an electronic device with NFC technology can be a time consuming process, requiring the user to search through numerous applications, determining which NFC emulated card to select, and then selecting the appropriate NFC card profile on the electronic device.

SUMMARY

Embodiments of the present invention provide systems, methods, and computer program products for establishing a near field communications (NFC) link between a source computer system and a target computer system. In one embodiment, a method is provided, the method comprising: capturing, by a source computer system, an indicator by receiving inputs from the one or more sensors and converting the received inputs into digital signals for subsequent processing by the source computer system; determining, by a source computer system, whether a captured indicator matches a stored user-defined indicator; responsive to determining that the captured indicator matches the stored user-defined indicator, executing, by the source computer system, an action assigned to the user-defined indicator; capturing, by a source computer system, a secondary indicator by receiving inputs from the one or more sensors and converting the received inputs into digital signals for subsequent processing by the source computer system; determining, by a source computer system, whether the captured secondary indicator matches a stored secondary indicator; and responsive to determining that the captured secondary indicator matches a stored secondary indicator, executing, by a source computer system, a secondary action assigned to the stored secondary indicator, wherein the secondary action establishes an NFC link between the source computer system and the target computer system.

DETAILED DESCRIPTION

Embodiments of the present invention provide time-efficient and effective systems and methods for enabling near field communications (NFC) on electronic devices using one or more indicators. Embodiments of the present invention provide systems and methods that utilize indicators, such as detecting motion of the electronic device or of a user, receiving electromagnetic wave signals, and receiving audio signals. In this manner, as discussed in greater detail in this specification, embodiments of the present invention can be used to improve ease of access and time efficiency for a user of an electronic device to enable near field communications for various applications.

Figure 1:
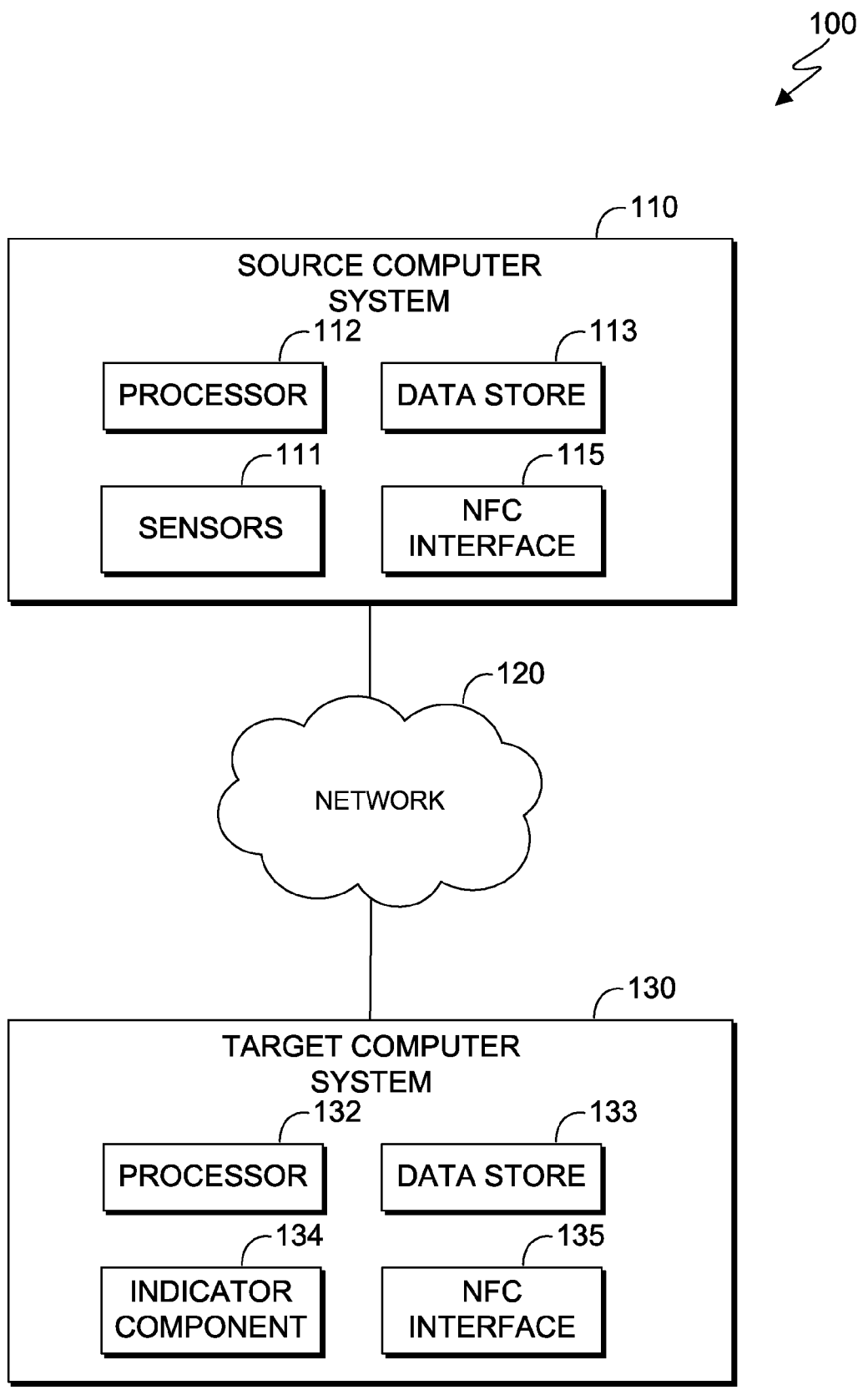
FIG. 1 is a block diagram of a near field communications (NFC) environment, in accordance with an embodiment of the present invention.

FIG. 1 is a functional block diagram of near field communications (NFC) environment 100, in accordance with an embodiment of the present invention. NFC environment 100 includes source computer system 110 and target computer system 130, interconnected by network 120. Source computer system 110 and target computer system 130 are representative of any electronic devices, or combination of electronic devices, capable of executing machine-readable program instructions, as described in greater detail with regard to FIG. 4. Furthermore, source computer system 110 and target computer system 130 are configured such that an NFC link can be established between them.

Source computer system 110 includes, sensors 111, processor 112, data store 113, and near field communications (NFC) interface 115. Sensors 111 may include a plurality of components that can capture indicators, such as visual indicators (e.g., cameras), other electromagnetic waves (e.g., infrared sensors), audio indicators (e.g., microphones), rotational motion, linear motion, and acceleration and deceleration (e.g., accelerometers), among other indicators. Sensors 111 transmit indicators to processor 112 for subsequent processing.

Processor 112 executes instructions (i.e., logical, control, input/output (I/O), etc.) to facilitate operations of source computer system 110. Processor 112 analyzes indicators captured by sensors 111 and compares the captured indicators with stored indicators stored in data store 113, as described in greater detail later in this specification.

Data store 113 contains a library of stored indicators and pertinent information (e.g., assigned actions to be performed by source computer system 110, etc.). In this embodiment, data store 113 contains predefined and/or user-defined indicators that can be modified by a user, as described in greater detail with regard to FIG. 2. Data store 113 can be accessed by processor 112 to determine whether a captured indicator matches a stored indicator.

NFC interface 115 is used to establish an NFC link between target computer system 130 and source computer system 110. NFC interface 115 can switch between an active mode in which NFC interface 115 transmits a polling signal, and an idle mode in which NFC interface 115 does not transmit a polling signal. In this embodiment, an NFC link is established when NFC interface 115 is switched to the active mode (i.e., activating the NFC radio). In certain embodiments, NFC interface 115 can emulate multiple payment options. For example, a stored indicator or a secondary indicator may correspond to selecting one or more payment options (e.g., a credit card), as described in greater detail with regard to FIG. 3. It should be understood that NFC interface 115 can be configured to establish an NFC link between source computer system 110 and target computer system 130 to perform a plurality of actions, for a variety of applications, in response to captured indicators. For example, establishing an NFC link can be used to exchange personal information, grant authorization/authentication to access a facility, transmit general information (e.g., pricing, terms, conditions, objects for sale, broadcasting a consumer needs, etc.), or as a secondary wireless connection (e.g., to improve ease of connectivity via Bluetooth).

Network 120 can be, for example, a local area network (LAN), a wide area network (WAN) such as the Internet, or a combination of the two, and include wired, wireless, or fiber optic connections (e.g., Bluetooth, WiFi, USB lead, etc.). In general, network 120 can be any combination of connections and protocols that will support communications between source computer system 110 and target computer system 130, in accordance with an embodiment of the invention.

Target computer system 130 includes processor 132, data store 133, indicator component 134, and NFC interface 135. In this embodiment, processor 132 and data store 133 are a processing unit and a storage component known in the art, respectively. Indicator component 134 provides a secondary indicator captured by sensors 111. In this embodiment, a two-step authentication process is used to establish an NFC link between source computer system 110 and target computer system 130, as described in greater detail with regard to FIG. 3. Furthermore, processor 112 uses the received secondary indicator to determine whether NFC interface 115 is switched to the active mode.

It should be understood that, for illustrative purposes, FIG. 1 does not show other computer systems and elements which may be present when implementing embodiments of the present invention. For example, while FIG. 1 shows a single source computer system 110 and a single target computer system 130, NFC environment 100 can also include additional source computer systems 110 and target computer systems 130 that use NFC environment 100 to establish an NFC link.

Figure 2:
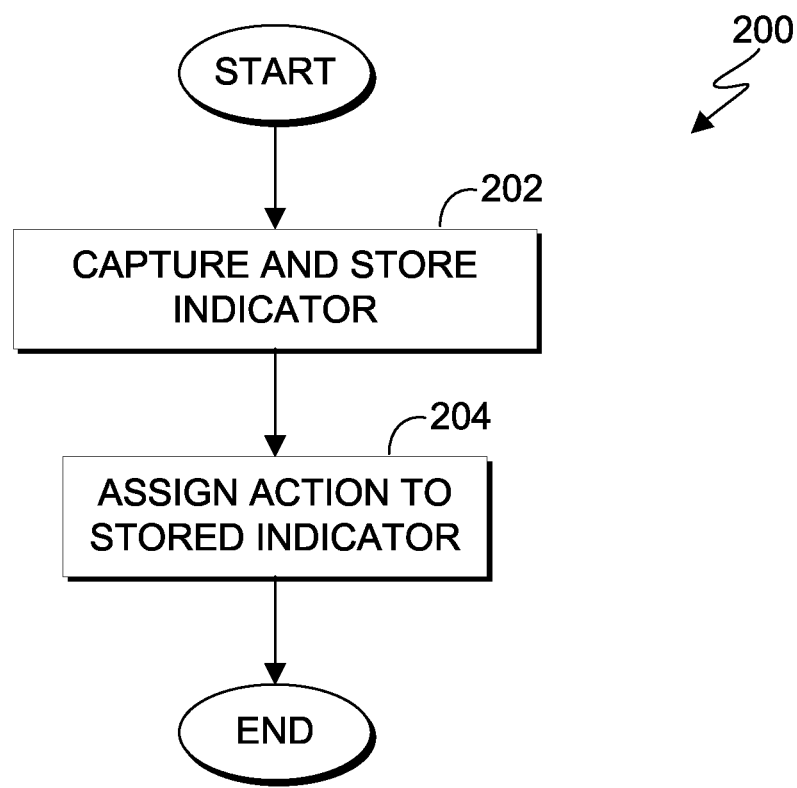
FIG. 2 is a flowchart illustrating operational steps for assigning an action to a stored indicator, in accordance with an embodiment of the present invention.

FIG. 2 depicts flowchart 200 illustrating operational steps for assigning an action to a stored indicator, in accordance with an embodiment of the present invention. Source computer system 110 may execute the assigned action subsequent to source computer system 110 verifying a captured indicator matches the stored indicator to which the action is assigned. In this embodiment, a captured indicator matches a stored indicator if the two indicators are substantially similar to one another. Source computer system 110 implements a two-step authentication process to establish an NFC link between source computer system 110 and target computer system 130, as described in greater detail with regard to FIG. 3. For example, a first step of the two-step authentication process may comprise source computer system 110 capturing an indicator and verifying that the captured indicator matches a stored indicator. Accordingly, FIG. 2 illustrates operational steps for assigning an action to a stored indicator, wherein the stored indicator is used in the first step of the two-step authentication process, as described in greater detail with regard to FIG. 3.

In step 202, source computer system 110 captures and stores an indicator. As previously discussed, sensors 111 can capture various indicators, such as a motion pattern of source computer system 110, an electromagnetic wave signal (e.g., visual, infrared, etc.), an audio signal and combinations thereof, or of other indicators. In this embodiment, an indicator captured by sensors 111 is a motion pattern of source computer system 110 performed by a user of source computer system 110. For example, sensors 111 may capture an "S" shaped motion pattern of source computer system 110 performed by a user of source computer system 110. In this instance, sensors 111 receive information describing movement of source computer system 110 along linear directions, rotational directions, and acceleration/deceleration. The user of source computer system 110 determines whether to store the captured indicator in data store 113 or capture another indicator to be stored in data store 113. In another embodiment, a user of source computer system 110 may elect to capture different indicators instead of a motion pattern of source computer system 110 (e.g., a hand gesture). For example, sensors 111 (e.g., a front facing camera) may capture a hand gesture performed by the user of source computer system 110. In yet another embodiment, the user of source computer system 110 may elect to capture audio signals. For example, sensors 111 (e.g., a microphone) may capture an audio input of the user of source computer system 110 saying aloud: "NFC, pay with Visa®." In general, the user of source computer system 110 determines which indicator, or combinations of indicators, are to be captured by source computer system 110 and stored in data store 113. Furthermore, the stored indicator is converted into one or more digital signals for subsequent processing, as described in greater detail with regard to FIG. 3.

In step 204, the user of source computer system 110 assigns an action to the stored indicator. In this embodiment, the assigned action, executed by source computer system 110, prompts the user of source computer system 110 to complete the second step of the two-step authentication process for establishing an NFC link between source computer system 110 and target computer system 130. For example, the assigned action may comprise initiating a Quick Response (QR) code application, enabling Bluetooth connectivity, enabling NFC emulation, enabling another action, etc. In this embodiment, the assigned action activates sensors 111 to capture a secondary indicator, wherein the secondary indicator is provided by indicator component 134 of target computer system 130.

In certain embodiments, a service provider (e.g., American Express®, Facebook, AAA®, etc.) may receive pertinent NFC chip information for source computer system 110 and the stored indicator from step 202. The service provider may use the pertinent NFC chip information and stored indicator to authenticate the user of source computer system 110, as well as source computer system 110, for a given application (e.g., a payment process, exchanging personal information, etc.). For example, the user of source computer system 110 may attempt to establish an NFC link between target computer system 130 and source computer system 110. In this instance, the service provider allows the NFC link between source computer system 110 and target computer system 130 to be established if an indicator captured by source computer system 110 matches the stored indicator provided to the service provider, as well as matching the NFC chip information. In this instance, a service provider authentication process provides additional security, ensuring that the NFC chip is used by an authorized user of source computer system 110.

Accordingly, by performing the operational steps of FIG. 2, a user of source computer system 110 may capture and store an indicator, and may assign a specific action to the stored indicator. A subsequent detection of the stored indicator may indicate a willingness of the user of source computer system 110 to conduct a transaction, and commence a two-step authentication process (further described with respect to FIG. 3).

Figure 3:
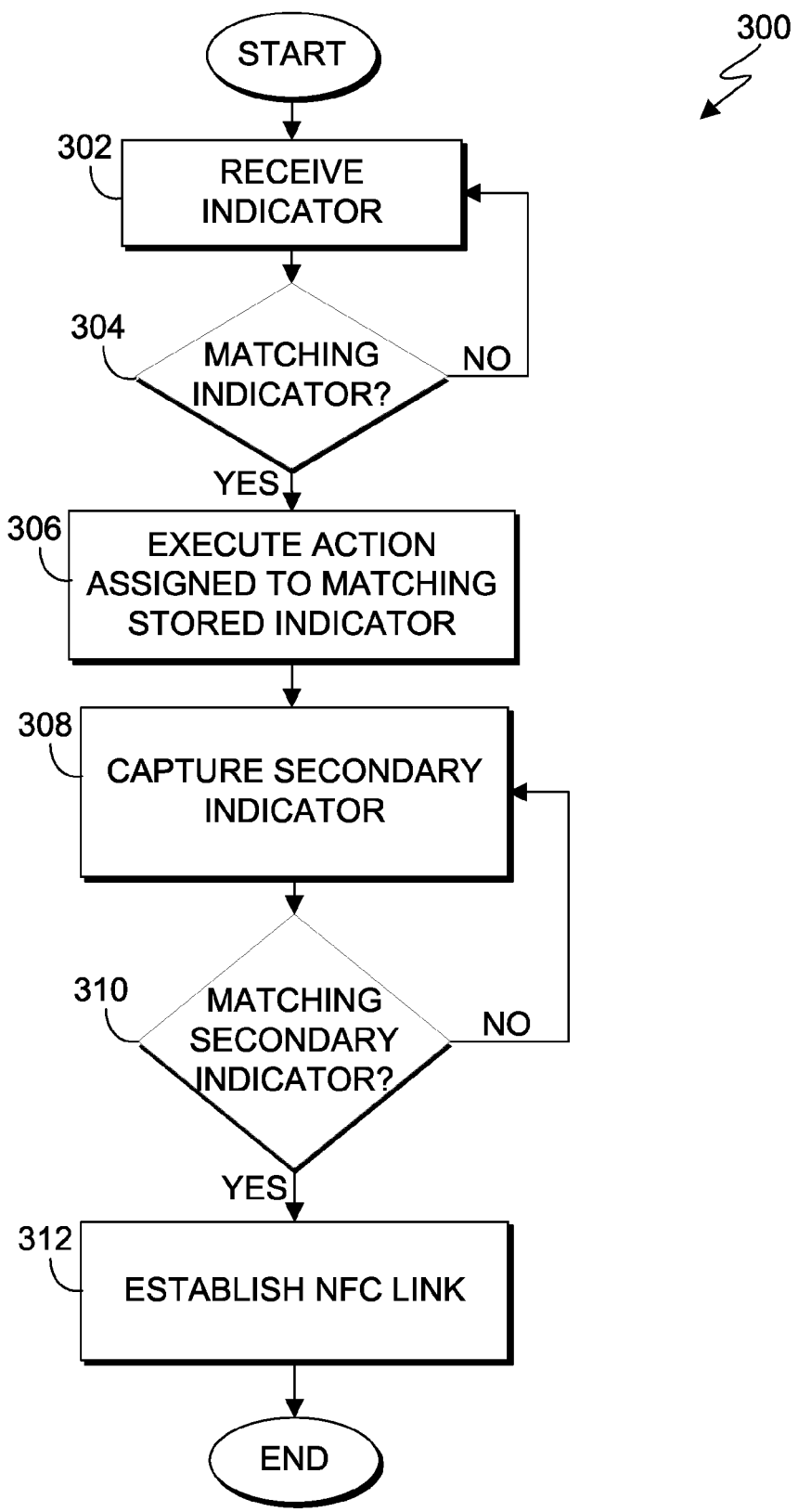
FIG. 3 is a flowchart illustrating operational steps for establishing an NFC link between a source computer system and a target computer system, in accordance with an embodiment of the present invention.

FIG. 3 depicts flowchart 300 illustrating operational steps for establishing a near field communication (NFC) link between source computer system 110 and target computer system 130, in accordance with an embodiment of the present invention. In this embodiment, a two-step authentication process is implemented. In other embodiments, a one-step authentication process may be implemented.

In step 302, processor 112 receives an indicator, captured by sensors 111. In this embodiment, sensors 111 are configured to actively detect motion, visual, audio, and other indicators. In another embodiment, a user of source computer system 110 may specify when to capture an indicator. For example, a user of source computer system 110 may tap the display of source computer system 110 and subsequently, source computer system 110 activates sensors 111 to capture an indicator (e.g., a motion path of source computer system 110). Subsequent to receiving the captured indicator, processor 112 converts the captured indicator into one or more digital signals for further processing.

In step 304, processor 112 determines whether the captured indicator matches a stored indicator. In this embodiment, processor 112 compares one or more digital signals describing the captured indicator to one or more digital signals describing the stored indicators. The stored indicators are stored in data store 113 and were provided by the user of source computer system 110, as described in step 202 of FIG. 2. For example, processor 112 compares one or more digital signals describing the motion path captured by sensors 111 in step 302 to one or more digital signals describing a pre-defined motion path stored (i.e., a stored indicator) in data store 113.

If, in step 304, processor 112 determines that the captured indicator does not match a stored indicator, then in step 302, sensors 111 captures another indicator. For example, the compared one or more digital signals describing the captured and stored indicator may deviate outside a specified threshold, in which case, the user of source computer system 110 is prompted to capture another indicator for subsequent processing.

If, in step 304, processor 112 determines that the captured indicator does match a stored indicator, then in step 306, source computer system 110 executes the action assigned to the matching stored indicator. In other embodiments (e.g., a one-step authentication method), responsive to determining that the captured indicator matches the stored indicator, the NFC chip is enabled (NFC interface 115 is switched to the active mode), and the user of source computer system 110 may proceed with a transaction. For example, the user of source computer system 110 who is paying for a regular service, or by a standard payment method, may use this option when a quick payment is desired and a secondary indicator is not necessary. In this embodiment, source computer system 110 activates sensors 111 to capture a secondary indicator. For example, indicator component 134 provides the secondary indicator, such as a vendor-specific QR code, that may be disposed on target computer system 130.

The secondary indicator can be captured and used by processor 112 to determine whether a warranted attempt to establish an NFC link between source computer system 110 and target computer system 130 is made. In general, source computer system 110 executes an action assigned to the captured indicator that was specified by the user, as described in step 204 of FIG. 2.

In step 308, sensors 111 captures a secondary indicator. In another embodiment, the user of source computer system 110 may specify when to capture the secondary indicator. For example, the user of source computer system 110 may tap the display of source computer system 110, confirming that operational steps described up to step 306 are complete (i.e., the first step of the two-step authentication process is complete). Subsequently, source computer system 110 activates sensors 111 to capture the secondary indicator (e.g., a vendor-specific QR Code). Furthermore, the captured secondary indicator is converted into one or more digital signals for subsequent processing.

In step 310, processor 112 determines whether the captured secondary indicator matches the secondary indicator provided by indicator component 134. In this embodiment, processor 112 compares the one or more digital signals describing the captured secondary indicator to the one or more digital signals describing the secondary indicator provided by indicator component 134.

If, in step 310, processor 112 determines that the captured secondary indicator does match the secondary indicator provided by indicator component 134, then in step 312, source computer system 110 establishes an NFC link between source computer system 110 and target computer system 130. In this embodiment, processor 112 switches NFC interface 115 to the active mode (i.e., source computer system 110 polls a radio signal to allow target computer system 130 and source computer system 110 to communicate). Furthermore, processor 112 switches NFC interface 115 to the idle mode (i.e., source computer system 110 stops polling a signal) once the user of source computer system 110 indicates that the established NFC link is no longer required, or after a pre-defined idle time. Additionally, NFC interface 115 may automatically initiate an action (e.g., a desired payment process, exchange of contact information, verification of credentials, etc.) once an NFC link is established, depending on the indicator and/or secondary indicator captured. For example, one indicator (e.g., a "V" shaped motion path of source computer system 110) may be assigned to a payment process using a VISA® credit card. Once an indicator and secondary indicator are captured, analyzed, and verified, NFC interface 115 may establish the NFC link between source computer system 110 and target computer system 130. Furthermore, NFC interface 115 may be modified to exhibit characteristics of a VISA® credit card (i.e., NFC card emulation). It should be understood that multiple user defined indicators may be created, as described in FIG. 2, for different automated actions. For example, a user of source computer system 110 may frequently use multiple credit cards (e.g., VISA® and American Express®). In this instance, another indictor (e.g., an "A" shaped motion path of source computer system 110) may be assigned to a payment process using an American Express® credit card, and NFC card emulation can be performed upon completing the two-step authentication process. In another embodiment, NFC interface 115 can be used to establish an NFC link for a variety of functions (e.g., unlocking a door, unlock a box, enter a password in a PC, providing contact details, signing a contract, etc.).

If, in step 310, processor 112 determines that the captured secondary indicator does not match the secondary indicator provided by indicator component 134, then in step 308 sensors 111 captures another secondary indicator, as previously discussed.

Accordingly, by performing operational steps of FIG. 3, the ease of use and time-effectiveness for establishing an NFC link between source computer system 110 and target computer system 130 is increased. Additionally, implementing the two-step authentication method helps establish more secure NFC links for sensitive applications (e.g., ensuring a payment receiver; in this case, target computer system 130 is an authorized receiver). Additionally, indicators from indicator component 134 that are utilized for two-step authentication processes may reduce security risks due to accidental or fraudulent use of indicators to establish an NFC link.

Figure 4:
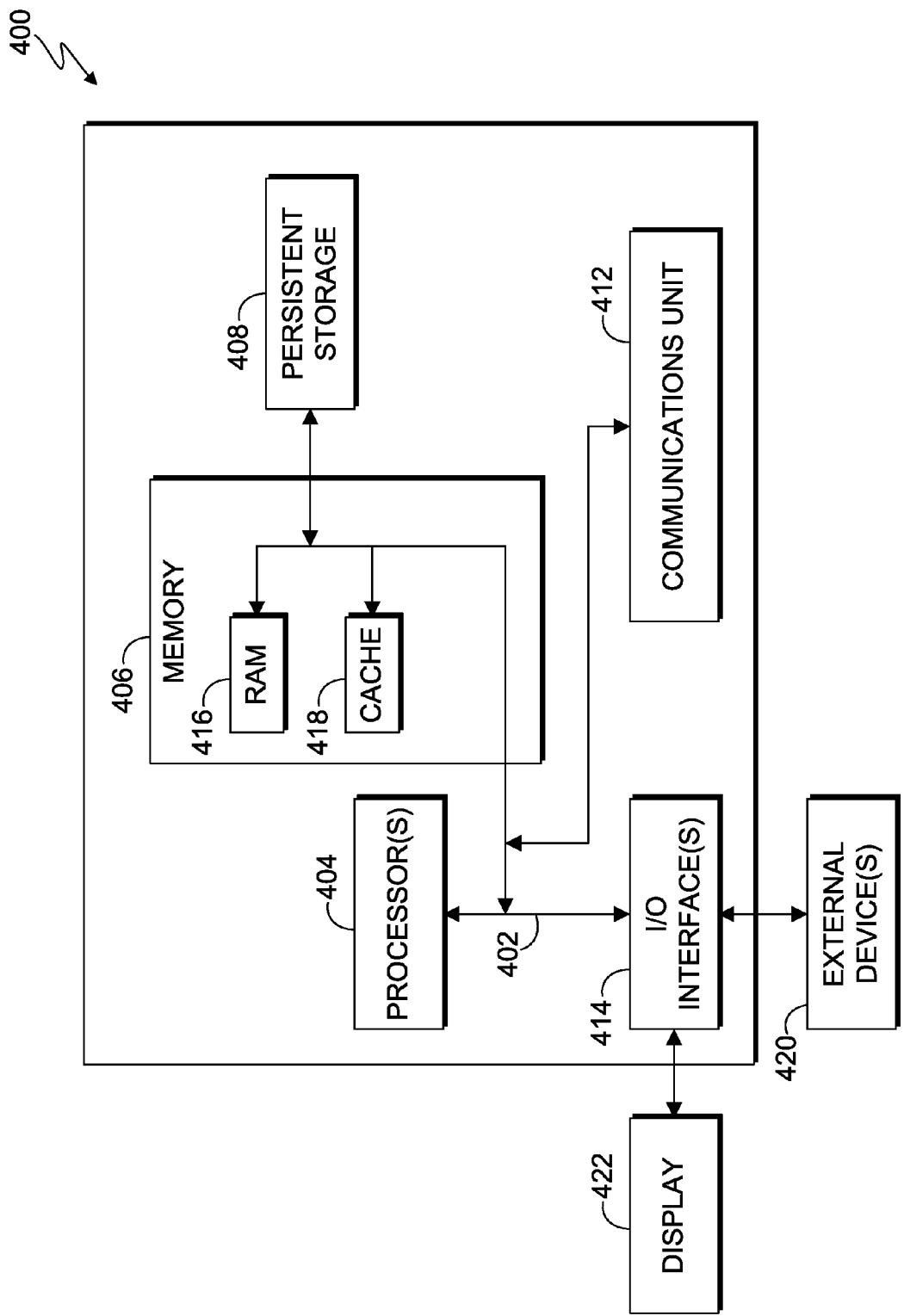
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for establishing a Near Field Communications (NFC) link between a source computer and a target computer, the method comprising:
  receiving, by a source computer, information for a primary user-defined indicator, including at least information describing a first movement of the source computer along at least a linear direction, and receiving a secondary user-defined indicator, including information representing a first quick-response (QR) code;
  receiving, by the source computer from one or more sensors of the source computer, a first set of information, including at least information describing a second movement of the source computer along at least the linear direction;
  determining, by the source computer, whether the first set of information matches the primary user-defined indicator;
  responsive to determining that the first set of information matches the primary user-defined indicator, activating, by the source computer, a camera of the source computer;
  receiving, by the camera of the source computer, a second set of information, including information representing a second QR code displayed by the target computer;
  determining, by the source computer, whether the second set of information matches the secondary user-defined indicator; and responsive to determining that the second set of information matches the secondary user-defined indicator, establishing, by the source computer, the NFC link between the source computer and the target computer.

2. The method of claim 1, further comprising:
responsive to determining that the second set of information does not match the secondary user-defined indicator, disabling, by the source computer, an NFC chip of the source computer.

3. The method of claim 1, wherein establishing the NFC link between the source computer and the target computer comprises:
activating, by the source computer, the NFC chip of the source computer by polling a radio signal to establish the NFC link between the source computer and the target computer.

4. The method of claim 1, further comprising:
disabling, by the source computer, the NFC link between the source computer and the target computer after a predefined time.

5. A computer program product embodied on one or more non-transitory computer readable storage media for establishing a Near Field Communications (NFC) link between a source computer and a target computer, comprising:
the one or more computer readable storage media and program instructions stored on the one or more computer readable storage media, the program instructions comprising:
program instructions to receive information for a primary user-defined indicator, including at least information describing a first movement of the source computer along at least a linear direction, and receive a secondary user-defined indicator, including information representing a first quick-response (QR) code;
program instructions to receive a first set of information, including at least information describing a second movement of the source computer along at least the linear direction;
program instructions to determine whether the first set of information matches the primary user-defined indicator;
program instructions to, responsive to determining that the first set of information matches the primary user-defined indicator, activate a camera of the source computer;
program instructions to receive a second set of information, including information representing a second QR code displayed on the target computer;
program instructions to determine whether the second set of information matches the secondary user-defined indicator; and
program instructions to, responsive to determining that the second set of information matches the secondary user-defined indicator, establish the NFC link between the source computer and the target computer.

6. The computer program product of claim 5, wherein the program instructions stored on the one or more computer readable storage media further comprise:
program instructions to, responsive to determining that the second set of information does not match the secondary user-defined indicator, disable an NFC chip of the source computer.

7. The computer program product of claim 5, wherein the program instructions to establish the NFC link between the source computer and the target computer comprise:
program instructions to activate the NFC chip of the source computer by polling a radio signal to establish the NFC link between the source computer and the target computer.

8. The computer program product of claim 5, wherein the program instructions stored on the one or more computer readable storage media further comprise:
program instructions to disable the NFC link between the source computer and the target computer after a predefined time.

9. A computer system for establishing a Near Field Communications (NFC) link between a source computer and a target computer, comprising:
one or more computer processors;
one or more non-transitory computer readable storage media;
program instructions stored on the computer readable media for execution by at least one of the one or more processors, the program instructions comprising:
program instructions to receive information for a primary user-defined indicator, including at least information describing a first movement of the source computer along at least a linear direction, and receive a secondary user-defined indicator, including information representing a first quick-response (QR) code;
program instructions to receive a first set of information, including at least information describing a second movement of the source computer along at least the linear direction;
program instructions to determine whether the first set of information matches the primary user-defined indicator;
program instructions to, responsive to determining that the first set of information matches the primary user-defined indicator, activate a camera of the source computer;
program instructions to receive a second set of information, including information representing a second QR code displayed on the target computer;
program instructions to determine whether the second set of information matches the secondary user-defined indicator; and
program instructions to, responsive to determining that the second set of information matches the secondary user-defined indicator, establish the NFC link between the source computer and the target computer.

10. The computer system of claim 9, wherein the program instructions stored on the one or more computer readable storage media further comprise:
program instructions to, responsive to determining that the second set of information does not match the secondary user-defined indicator, disable an NFC chip of the source computer.

11. The computer system of claim 9, wherein the program instructions to establish the NFC link between the source computer and the target computer comprise:
program instructions to activate the NFC chip of the source computer by polling a radio signal to establish the NFC link between the source computer and the target computer.

* * * * *